United States Patent [19]

Arms et al.

[11] 4,138,333

[45] Feb. 6, 1979

[54] WASTE MATERIAL DIGESTERS

[75] Inventors: Milo F. Arms, Marion Township, Marion County; James S. Ireland, Pleasant Township, Marion County, both of Ohio

[73] Assignee: The Fairfield Engineering Company, Marion, Ohio

[21] Appl. No.: 797,568

[22] Filed: May 16, 1977

[51] Int. Cl.² .................................................. C02C 1/08
[52] U.S. Cl. .................................. 195/127; 210/149;
210/219; 210/96 R; 261/91; 422/105; 422/225; 422/229
[58] Field of Search .......................... 23/259.1; 71/9;
210/219, 242 A, 523, 530, 96 R, 149; 261/87, 91, 93

[56] References Cited

U.S. PATENT DOCUMENTS

| | | | |
|---|---|---|---|
| 1,434,596 | 11/1922 | Dorr | 210/530 |
| 3,114,622 | 12/1963 | Hardy | 23/259.1 X |
| 3,314,765 | 4/1967 | Abson et al. | 71/9 X |
| 3,357,812 | 12/1967 | Snell | 23/259.1 X |
| 3,756,784 | 9/1973 | Pittwood | 71/9 X |
| 3,778,233 | 12/1973 | Blough et al. | 71/9 X |
| 3,975,469 | 8/1976 | Fuchs | 261/91 X |

OTHER PUBLICATIONS

Webster's Seventh New Collegiate Dictionary, copyright 1965, p. 66.

*Primary Examiner*—Robert H. Spitzer
*Attorney, Agent, or Firm*—Buell, Blenko & Ziesenheim

[57] ABSTRACT

The specification discloses an improved form of waste digester in which agitator screws are separately adjustable for speed and for angular position forward and to one side. Speed control and retraction of the probes from the digesting mass are also disclosed.

9 Claims, 6 Drawing Figures

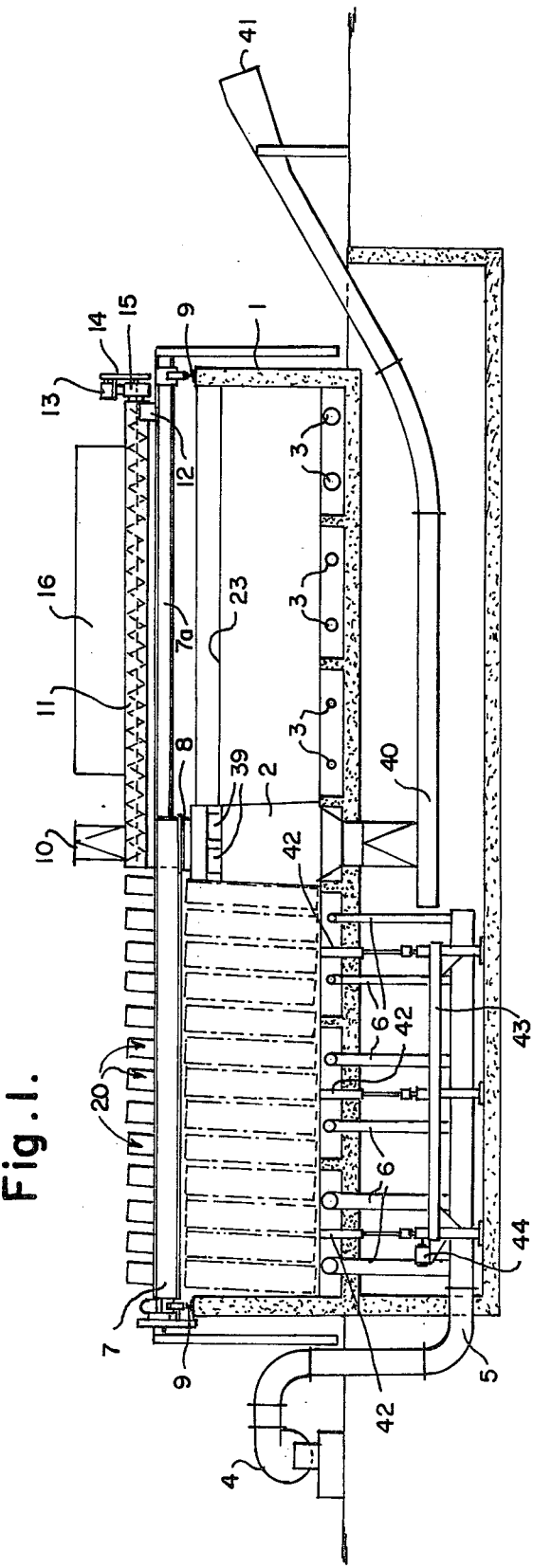

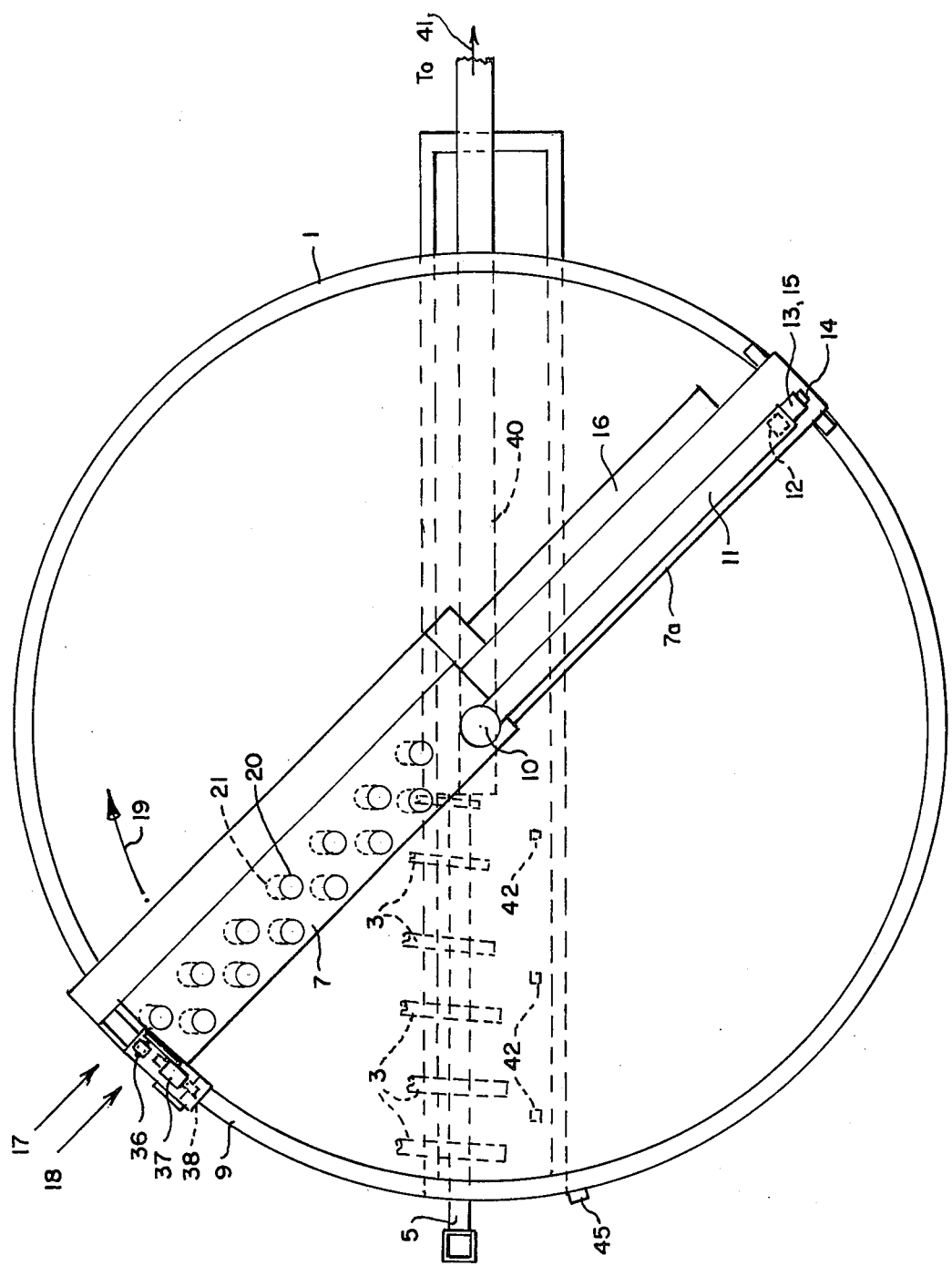

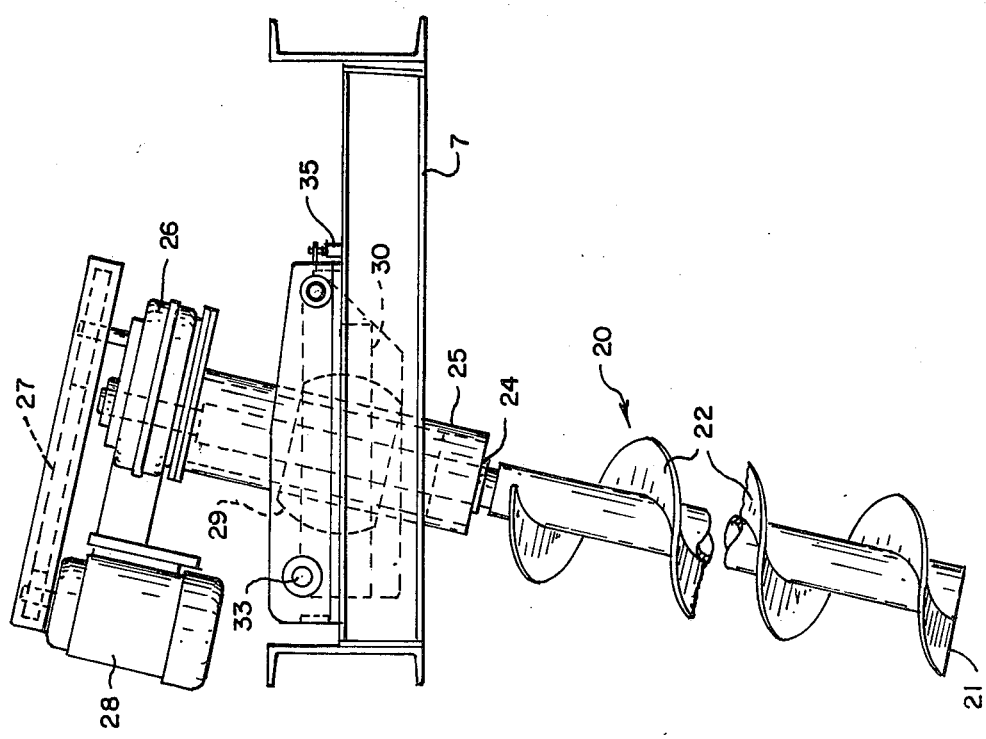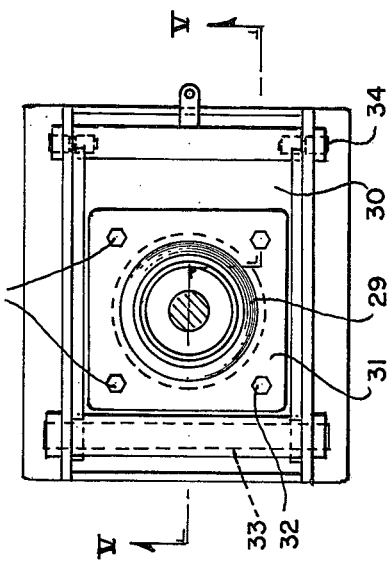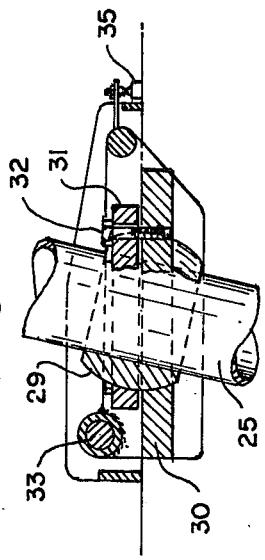

WASTE MATERIAL DIGESTERS

This application relates to improvements in digesters for waste material and more particularly to the arrangement of agitator means for such digesters to provide uniform flow through of material without short circuiting directly between supply and discharge.

The use of digesters to dispose of garbage, sewage sludge and other organic material is becoming of increasing importance. Digesters in various forms have previously been used but have had somewhat limited commercial acceptability because of problems in operation and lack of uniformly satisfactory results. A digester of a type which has been used on a limited basis is shown in Hardy U.S. Pat. No. 3,114,622. The Hardy patent shows a circular receptacle to receive waste material which is advanced from one side of the receptacle (the outer perimeter) toward the opposite side of the receptacle (the center). A rotating bridge or carriage is provided with a series of inclined agitator screws intended to lift the waste material and intermix it with air for bacterial decomposition. While the concept of the Hardy digester is sound, difficulties have occurred with short circuiting of fresh material introduced into the digester. It has been found for example that a retention period in the digester of perhaps 4 to 6 days is desirable to permit suitable bacterial action and to produce a stable non-offensive organic material. In some instances, however, material freshly introduced has passed through the digester to the outlet within a matter of hours before digestion has taken place. Accordingly, the output has been contaminated with new material.

Also, some material has become lodged within the digester and has been retained there for periods far in excess of the maximum desired time.

Various schemes have been tried to overcome these problems involving various arrangements of the aerator screws. It has been proposed, for example, to arrange the screws upon the carriage in two or more rows in the hope that this will prevent short circuiting of material from one screw directly to the next to the outlet of the digester within a more shortened period. The results have not been satisfactory, however.

We provide a series of aerator screws arranged at an angle to the vertical with the bottom of each screw being located ahead of and toward the inlet from the top of the screw. We prefer to arrange the screws in at least two substantially radial rows. We further prefer to provide an adjustable mounting whereby the angle of each screw may be individually adjusted for best results. We prefer to provide separate drive means for each screw with speed control means for individual adjustment. We prefer to provide retractable probes within the mass of digested material to sense the condition of the digested material and to indicate the desirable operation of the digester. We prefer to actuate retraction of the probes by switch means actuated as the carriage approaches the position of the probes. We prefer to provide an angularly positioned side wall on the discharge side of the receptacle, the side wall being at substantially the same angle as the screw closest the discharge side whereby pockets for accumulation of dead material are eliminated.

Other details, objects and advantages of our invention will become more apparent as the following description of a present preferred embodiment proceeds.

In the accompanying drawings we have illustrated a present preferred embodiment of our invention in which:

FIG. 1 is a side elevational view taken in section showing a digester embodying our invention;

FIG. 2 is plan view of the digester shown in FIG. 1;

FIG. 3 is a side elevational view of one of the agitator screws and the drive therefore;

FIG. 4 is a plane view taken partly in section showing the mounting for one of the agitator screws;

FIG. 5 is a sectional view taken on line V—V of FIG. 4; and

FIG. 6 is a partial elevational view showing the drive mechanism for the carriage.

Referring particularly to FIGS. 1 and 2, the digester comprises an upwardly open cylindrical structure having a circular outer wall 1 and a circular inner wall 2. The walls define feed and discharge sides of the receptacle across which organic material is moved during the course of digestion. Air conduits 3 are provided in the bottom of the receptacle to receive air supplied from a fan 4 through a minifold 5 leading to supply pipes 6 connected to air conduits 3. Manifold 5 and supply pipes 6 are located in a pit under the material receptacle as shown in FIG. 1. A carriage 7 is provided spanning between outer wall 1 and inner wall 2. The inner end of carriage 7 is carried upon a central bearing structure 8 and the outer end rides upon a rail 9 which is placed on top of outer wall 1 around the circumference of the digester. A receiving hopper 10 for waste material is placed above bearing structure 8. An extension 7a of carriage 7 extends from bearing structure 8 to the opposite side of the receptacle. A screw conveyor 11 located on carriage extension 7a extends from receiving hopper 10 to a discharge chute 12. Screw conveyor 11 is driven by an electric motor 13 through a belt drive 14 and gear reducer 15. A control panel 16 is mounted on extension 7a. A plurality of agitator screws are mounted on carriage 7 between outer wall 1 and inner wall 2. The screws are arranged in two rows 17 and 18 which extend generally radially (FIG. 2). Carriage 7 rotates in the direction of arrow 19 with the result that row 17 is in front of row 18 as the carriage rotates upon bearing 8.

Each screw 20 is angled so that the bottom of the screw 21 is forward of and toward the outer wall from the top of the screw. Each screw comprises a helical flight 22 which, when the screw is rotated, serves to elevate material from the bottom of the receptacle and to maintain continuous agitation of material in the receptacle. The normal level of material being digested is shown by line 23 (FIG. 1). The upper end of each screw is journaled in a bushing 24 mounted in a sleeve 25. A gear reducer 26 is mounted on the upper end of sleeve 25 driven through a belt 27 from variable speed motor 28. Sleeve 25 is fitted in a semi-sperical ball member 29 which is clamped between a bracket 30 and a clamping plate 31. By tightening down cap screws 32, the ball and socket mechanism may be clamped in any position, thereby allowing the angular position of each screw to be adjusted and maintained. Bracket 30 is rotatably mounted upon hinge pin 33 which is in turn mounted upon carriage 7. Hinge pin 33 is on the forward side of screw 20 as bridge 7 rotates. Shear pins 34 connect bracket 30 to carriage 7 on the trailing side of each screw 20. A limit switch 35 is fitted between the rear edge of bracket 30 and carriage 7.

Carriage 7 is driven by an electric motor 36 through a speed reducer 37 which drives a wheel 38 riding on rail 9.

Inner wall 2 is conical in section (FIG. 1) with the outwardly flaring base being at substantially the same angle to the vertical as the innermost screw 20. An outlet 39 for digested material is provided between inner wall 2 and bearing structure 8. Digested material which passes over the top of the inner wall 2 falls through the central cavity to a conveyor 40 in the pit below the receptacle. Conveyor 40 carries digested material from the pit to a discharge point 41.

A plurality of probes 42 are mounted in the pit beneath the receptacle on a structure 43. The probes project upwardly through holes in the bottom of the receptacle into the mass being digested. An electric motor 44 is operable to drive the probes up and down through a conventional shaft and gear arrangement. Motor 44 is operated responsive to a limit switch 45 mounted upon outer wall 1.

In operation of the digester, raw material, such as municipal garbage is dumped into hopper 10 after screening, magnetic separation, pulping etc. The material is then conveyed by screw 11 to discharge chute 12. As the digester comes into operation the material will fill the circular receptacle to level 23. In the normal course of operation material for digestion will be delivered during only a part of the day. While material is being received carriage 7 will be rotated, either continuously or incrementally, so that raw material is discharged uniformly around the outer edge just inside outer wall 1. The speed of motor 36 is controlled to provide a desirable speed of rotation fitted to the rate of feed. As carriage 7 rotates each of screws 20 will be driven by the associated motor. The fact that the lower ends of the screws are angled forward will assist in advancing carriage 7. The fact that the lower end of the screws are angled outwardly will cause the material to be moved consistently inwardly as it is brought to the top. The effect of the screws as shown in FIG. 1 is to thoroughly agitate and mix material in the digester across the entire width between the outer and inner walls as carriage 7 rotates. It is believed that the outward angle at the bottom of the screws causes a uniform steady movement of material from the outer wall to the inner wall. It is believed that as material is moved inwardly a zone is provided for receipt of the material next outwardly, thereby minimizing or eliminating short circuiting of material. It is further believed that the placement of the screws in at least two rows tends to prevent material at the top of one screw from being "handed off" to the top of the next screw and thereby short circuiting across the top of the digested material to discharge 39. The result is to provide a substantially uniform and predictable flow of material from the outer wall to exit 39. The use of a conical inner wall angled to the angle of inner most screw prevents accumulation of material in a dead space along the inner wall.

The speed of the individual screws may be adjusted to exactly fit the conditions required for suitable digestion. In the event that one of the screws should hit an unexpected obstruction the force will cause shear pins 34 to shear, permitting the screw to rotate about hinge pin 33 without damage. In the event bracket 30 rotates about hinge pin 33 the limit switch will open causing the enire digester to be shut down until the problem can be located and corrected.

Probes 42 normally sense the condition of the material (e.g. temperature, oxygen content) and automatically open and close motor-operated gates located between the air manifold 5 and air conduits 3 to supply the amount of oxygen needed for correct digestion. As carriage 7 approaches limit switch 45 and trips the switch, motor 44 is acutated to withdraw the probes while the screws pass over. As carriage 7 passes beyond limit switch 45 the limit switch will be released causing motor 44 to raise the probes back to operative position.

While we have illustrated and described a present preferred embodiment of our invention it is to be understood that our invention is not limited thereto and may be otherwise variously practiced within the scope of the following claims.

We claim:

1. In a digester having a receiver with an inlet side and an exit side to receive and hold material during digestion and a carriage which moves over said material during digestion and carries rotatable screws for agitation of the material, the improvement which comprises a plurality of screws extending in a generally vertical direction, said screws being disposed at an angle to the vertical in which the bottom of each said screw is positioned forward of and toward the inlet side from the top of the screw.

2. The improvement of claim 1 in which each screw is angularly adjustable relative to the carriage.

3. The improvement of claim 2 in which the angular adjustment means comprise a ball and socket joint.

4. The improvement of claim 2 in which drive means are provided for the carriage and screws, the speed of said drive means being separately adjustable.

5. The improvement of claim 1 in which the screws are arranged on the carriage in at least two generally radial rows.

6. The improvement of claim 5 in which the screws in the separate rows are in staggered relationship.

7. The improvement of claim 1 in which the wall of the receiver on the exit side is at an angle to the vertical and substantially parallel to the adjacent screw.

8. The improvement of claim 1 in which probe means extend into the receptacle in position to interfere with the screws, and carriage position sensing means are provided in controlling relationship to probe withdrawal means.

9. A digester for the bacterial decomposition of organic matter having a digestion zone with an inlet side from which raw material is received and an exit side to which digested material is discharged, said digester including a carriage which extends above the mass of material being digested and carries a plurality of agitating screws extending downwardly into the waste material and movable through the mass, said screws being characterized by a generally vertical alignment in which the bottom of each screw is located horizontally ahead of and toward the inlet side from the upper end of the same screw.

* * * * *

UNITED STATES PATENT AND TRADEMARK OFFICE
CERTIFICATE OF CORRECTION

PATENT NO. : 4,138,333
DATED : February 6, 1979
INVENTOR(S) : Milo F. Arms and James S. Ireland It is certified that error appears in the above-identified patent and that said Letters Patent are hereby corrected as shown below:

Column 2, line 9, "plane" should read --plan--.

Column 3, line 48, "oreliminating" should read --or eliminating--.

Signed and Sealed this

Twenty-sixth Day of June 1979

[SEAL]

Attest:

RUTH C. MASON
Attesting Officer

DONALD W. BANNER
Commissioner of Patents and Trademarks